Aug. 26, 1952  E. A. ROCKWELL  2,608,061
POWER UNIT PRESSURE RESPONSIVE DEVICE
Original Filed April 11, 1941  8 Sheets-Sheet 1

Inventor
Edward A. Rockwell
By Arthur Wright
Attorney

Aug. 26, 1952      E. A. ROCKWELL      2,608,061
POWER UNIT PRESSURE RESPONSIVE DEVICE
Original Filed April 11, 1941      8 Sheets-Sheet 4

Inventor
Edward A. Rockwell
By Arthur Wright
Attorney

Aug. 26, 1952  E. A. ROCKWELL  2,608,061
POWER UNIT PRESSURE RESPONSIVE DEVICE
Original Filed April 11, 1941  8 Sheets-Sheet 7

Fig. 9.

Inventor
Edward A. Rockwell
By Arthur Wright
Attorney

Patented Aug. 26, 1952

2,608,061

UNITED STATES PATENT OFFICE 2,608,061

POWER UNIT PRESSURE RESPONSIVE DEVICE

Edward A. Rockwell, Shaker Heights, Ohio

Original application April 11, 1941, Serial No. 388,002, now Patent No. 2,448,464, dated August 31, 1948. Divided and this application June 5, 1946, Serial No. 674,508

18 Claims. (Cl. 60—54.5)

My invention relates particularly to the construction of power units designed for delivering power for any desired purpose, but which is especially effective in connection with the operation of automotive accessories, as for instance automobile brakes.

The present application is a division of my copending application Ser. No. 388,002, filed April 11, 1941, upon Pressure Fluid Operated Pressure Intensifying Mechanism, Patent No. 2,448,464, granted August 31, 1948.

The object of my invention is to provide a power unit whereby an effective manual control for the delivery of power may be obtained. A further object is to provide effective valve means for the application of power, by means of fluid pressure. Another object is to provide a grommet valve construction for effectively controlling the inlet and outlet of a pressure differing from the atmospheric pressure, for the operation of the power unit. Another object is to provide an effective hydraulic cut-off valve means in a construction in which manual pressure is first applied, followed by the application of power under the control of the first mentioned pressure. Another object is to provide a power unit having a piston motor therein for operating a pressure-increasing plunger, the same being arranged in an effective manner with means to convey a vacuum to the power unit initially for submerging the piston therein with the aid of an external vacuum pipe connecting the ends of the power unit. Another object is to provide a hydraulic connection extending outside of the power unit, for delivering from the power unit a low pressure without the aid of power, followed by a power pressure. Another object is to provide a head portion for the power unit having a hydraulic inlet port and a hydraulic outlet delivery port as well as a hydraulic port for the control of the power unit. Further objects of my invention will appear from the detailed description of the same hereinafter.

While my invention is capable of embodiment in many different forms, for the purpose of illustration I have shown only certain forms thereof in the accompanying drawings, in which—

Referring first to the form of my invention shown in Figs. 1 to 4A and 9, I have shown a pedal 1 mounted on a lever 2 which is pivoted on a shaft 3 carried by a chassis of an automobile, not shown. A link 4 is attached to said lever 2 intermediate its ends so as to give any desired pedal ratio movement of the pedal 1 to the brake-operating link 4. The said link 4 is pivotally connected to an operating lever 5 of a master cylinder 6 which may be any desired form of master cylinder but, for example, such as disclosed in the patent to Loughead et al. No. 1,707,063, granted March 26, 1929. The lever 5 is carried on a shaft 7 passing into the master cylinder 6, which has an arm 8 for operating a piston 9 carried in a cylinder 10 within a storage chamber 11 having a vent 12 and a filler cap 13. When the pedal 1 is moved downwardly the piston 9 is adapted to discharge the liquid of the master cylinder from a flexible pipe 14 to an inlet opening fitting 15 screw-threaded in a valve casing 16 which in turn is screw-threaded in a head piece or casting 17 secured by screws 18 to an end closure 19 which is welded to an outer casing 20 having two pairs of ridges 21 and 22, between the ridges of each pair of which they are located straps 23 and 24 respectively. Each of the straps has horizontal end portions 25 which are maintained in their spaced positions by a sleeve 26 through which there is passed a bolt 27 having a nut 28. The horizontal end portions have vertically arranged ends 29, each of which has a nut 30 headed over into an opening 31 to receive a screw 32 arranged to pass through any desired part of the chassis frame for supporting the power unit. The liquid, upon being received from the master cylinder into the opening 15, initially passes through a passageway 33 and thence past a valve seat 34 and out through openings 35, in the valve casing 16. From this point the liquid passes out through an opening 36 to a fitting 37 connected to a flexible pipe 38 which leads to brake cylinders 39 arranged to operate brake shoes 40 carried within brake drums on the automobile wheels.

Figure 4:
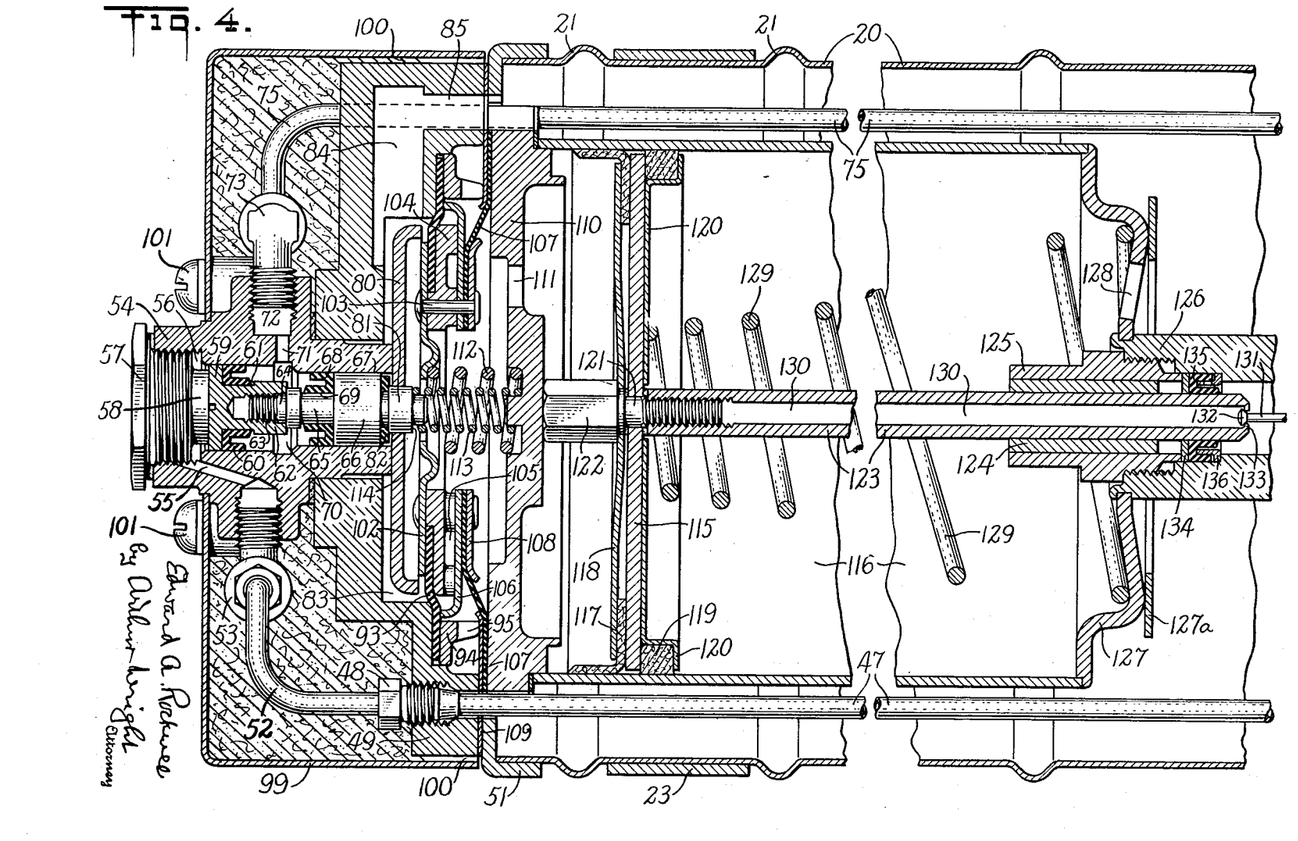
Figs. 4 and 4A show a view in a longitudinal section of the same taken on line 4—4 of Fig. 2 and 4—4 of Fig. 3.
Figure 4A:
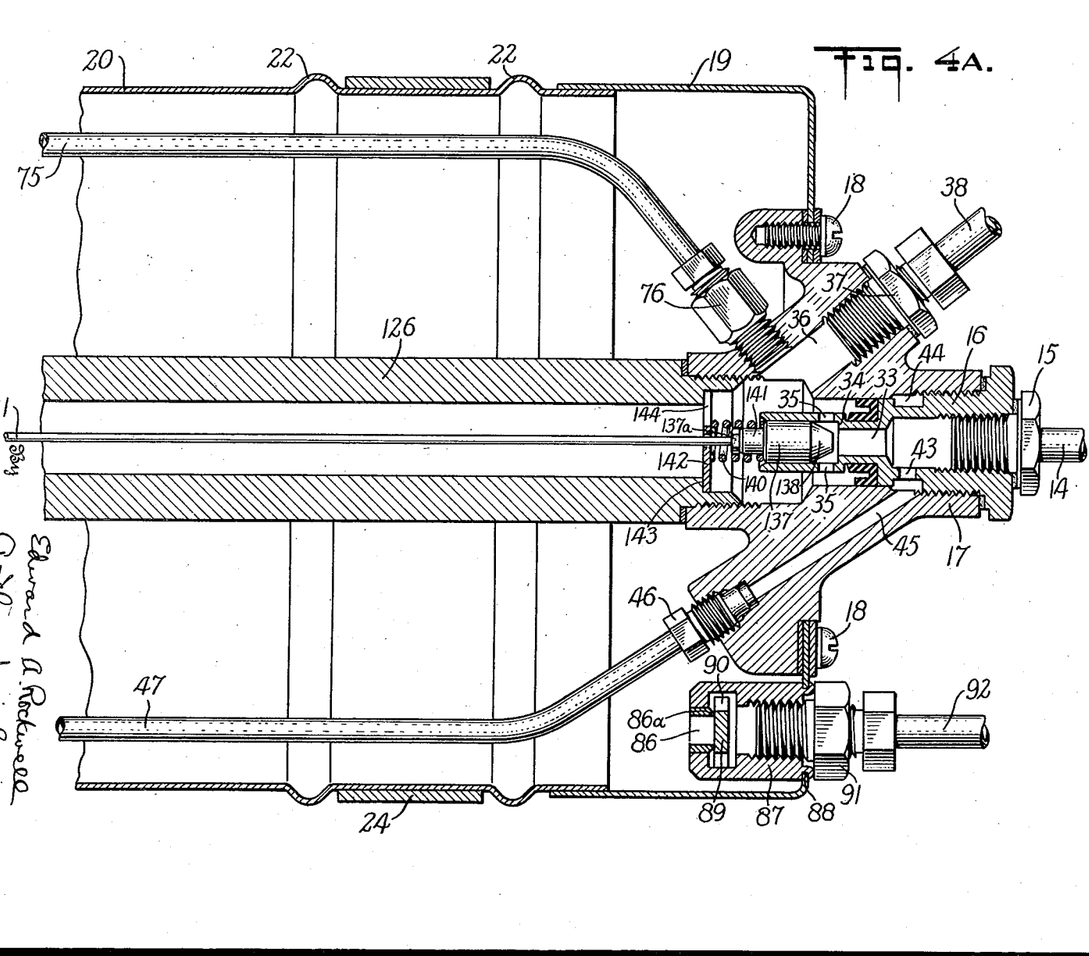
Figure 5:
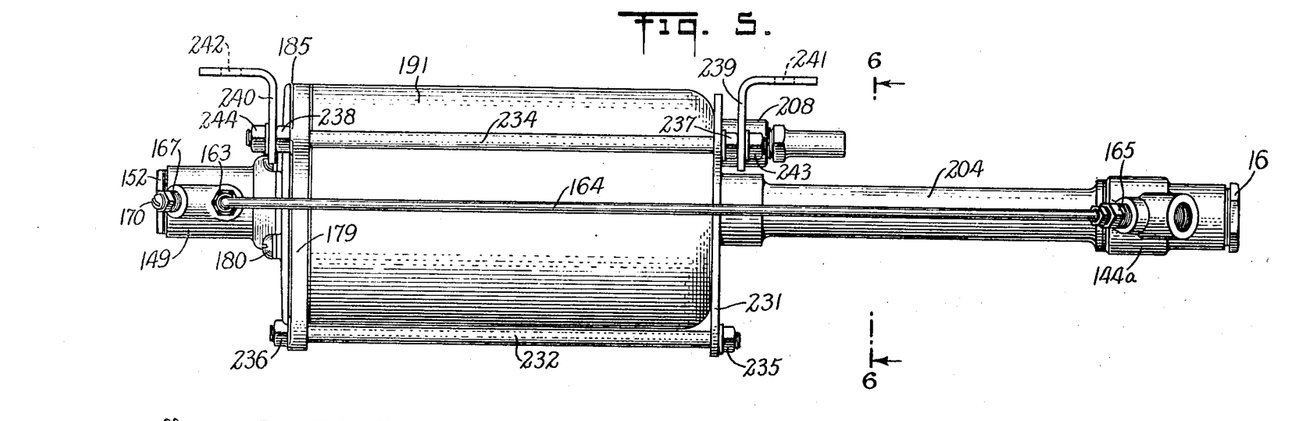
Fig. 5 is a plan view of a modified form of my invention.
Figure 6:
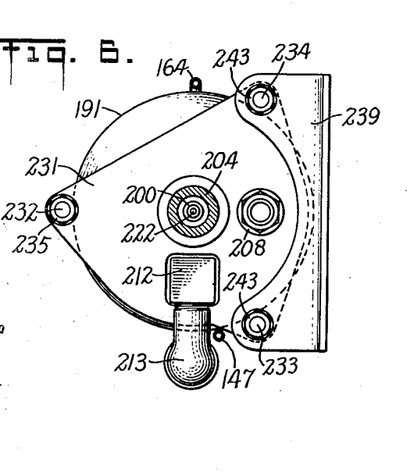
Fig. 6 is an end elevation of the same, taken partly in section on line 6—6 of Fig. 5.
Figure 7:
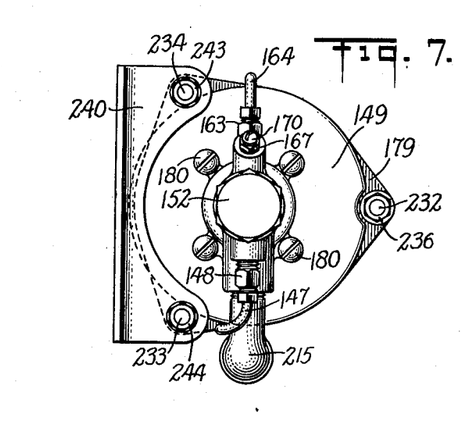
Fig. 7 is an elevation of the other end of the same.

The said pipe 38, by branch pipes, may lead to all four wheels in this way. A plug 42 normally closes the third available outlet for the liquid from the opening 36. The provision of the three outlets, where the fittings 37, 41 and plug 42 are located, enables the connections from the power unit to be readily adapted to the brakes irrespective of the different possible locations of the power unit on the chassis. The liquid from the master cylinder thus initially passed to the brakes, will move the brake shoes up into position preparatory to the latter application of power thereto for the main braking effect. Simultaneously with this initial application of the hydraulic liquid to the brakes the hydraulic liquid will be conveyed through a port 43 in the valve casing 16 to an annular chamber 44 on the outside thereof and thence by a passageway 45 to a fitting 46 connected by a pipe 47 within the outer casing 20 to a fitting 48 screw-threaded in a casting 49 which is secured by screws 50 to a ring 51 welded to the outside casing 20. The said fitting 48 has a pipe 52 connected thereto which conveys the hydraulic liquid to an angular fitting 53 which is screw-threaded into a plunger housing 54 so as to convey the liquid by a passageway 55 to a central passageway 56 in said plunger housing. The central passageway 56 is closed by a screw-threaded plug 57 having a reduced central extension 58 to act as a stop for a plunger head 59, but in such a manner as to leave said head 59 exposed to the pressure of the liquid from the passageway 55. The said plunger head 59 has a U-shaped rubber seal 60 in a recess 61 in a stem 62 connected to said head. The said stem 62 has an internal screw-thread 63 so as to receive a screw-threaded end 64 of a stem 65 attached to a smaller-diameter plunger 66 reciprocable within a smaller-diameter continuation 67 of said central opening 56. A U-shaped rubber seal 68 is located in a recess 69 around said stem 65. Between the said seals 60 and 68 there is thus formed a chamber 70 for transmitting at all times the reaction from the liquid applied to the brake to the manual means. This chamber 70 is connected by a passageway 71 to an opening 72 in the plunger housing 54, having therein an angular screw-threaded fitting 73 which in turn is connected by a fitting 74 to a pipe 75 which passes rearwardly on the inside of the outer casing 20 and terminates in a fitting 76 screw-threaded into the casing 17 so as to connect said pipe 75 with the opening 36 for the liquid which is conveyed to the wheel brakes. The said chamber 70 also is connected by a passageway 77 to an air bleeder 78 carrying a removable screw-threaded plug 79 of any desired construction, for periodically releasing any accumulated air from the said chamber 70. When the brakes are being moved into position, as above referred to, the increasing manual pressure from the master cylinder moves the plunger 66 rearwardly, before the power is applied, so as to close a disc-shaped outlet valve 80, said valve 80 being tightened on a cylindrical extension 81 on the plunger 66, a gasket 82 being provided in a circular recess between the plunger 66 and the extension 81. The said outlet valve 80 is located within a vacuum chamber 83 which is connected by a transverse passageway 84 to a longitudinal passageway 85 in the casting 49 and thence to the interior of the outer casing 60 which is at all times provided with a vacuum by means of a vacuum inlet port 86 in a ring-shaped seat 86a.

The ring 86a is located in a check valve casing 87 headed into an opening 88 in the end cover 19, said casing having within the same a check valve 89 with peripheral serrations 90 to readily permit the withdrawal of air during the intervals of suction, which is applied by a fitting 91 screw-threaded into said casing 87, having connected thereto a vacuum pipe 92 which leads to the engine manifold of the automobile or any other suitable source of suction. When moved as above referred to, the outlet valve 80 seats against a rubber diaphragm 93 supported within the casting 49, where it is held in place by a ring 94 having peripheral air inlet ports 95 for admitting air from an air inlet port 96 covered by a screen 97 leading to an air space 98 filled with horsehair in a cover 99 having access to the outlet air around its outer rim 100. The said cover 99 is held in place on the plunger housing 54 by means of screws 101. The inner periphery of the diaphragm 93 is supported by a ring 102 which is fastened by rivets 103 to a spacing ring 104 having radial ports 105 therein and to a disc-shaped inlet valve 106 also seating on said diaphragm 93, and to a supporting diaphragm 107 made of a fabric treated with an oxidized oil, and finally to a dished end plate 108. The outer periphery of said diaphragm 107 is supported between a gasket 109 carried on the face of the casting 49 and a cylinder head 110, having a port 111, which is held in place by the screws 50. The said cylinder head 110, furthermore, carries a helical spring 112, the other end of which rests against the ring 102 so as to normally seat the inlet valve 106, and the said head 110 also carries a smaller helical spring 113, the other end of which seats against a shoulder 114 on the extension 81 so as to normally unseat the outlet valve 80. The increasing pressure thus applied to the liquid within the pipe 52 will, as it is increased, retain the valve 80 in seated position while bowing the diaphragm 93 to such an extent as to open, as far as desired, the air inlet valve 106. Thus, the vacuum which, before the seating of the outlet valve 80, has previously entered through the ring 102 and the spacing ring 104 so as to pass through the port 111 to the right face of the cylinder head 110, will actuate a large piston 115 carried within a cylinder 116 within the casing 20. The said piston 115 has a leather ring 117 on one face thereof fitting within the said cylinder 116, where it is retained by a disc 118, and on the other face thereof a felt lubricating ring 119, carrying lubricating oil initially provided in the apparatus, said ring 119 being held in place by a disc 120. The piston 115, ring 118 and disc 120 are all carried on a piston rod 121 having a head 122 to act as a stop against the cylinder head 110, said rod 121 being screw-threaded for attachment thereof to a tubular piston rod 123, which passes out through a bushing 124 in a sleeve member 125 to which there is screw-threaded a cylinder 126. The other end of the cylinder 126 is screw-threaded to the casting 17. The said cylinder 126, at its forward end, is headed over into a cylinder end plate 127 provided with a vacuum aperture 128. In order to hold these parts together I have provided a clamping plate 127a through which bolts 127b pass. Said bolts, at one end, are screw-threaded into the plate 110 and at their other ends carry beneath the plate 127 shouldered sleeves 127c extending over the edge of the end plate 127, and these ends of the bolts 127b are provided with nuts 127d for fastening the cylinder 116 to its associated parts. The end plate 127, furthermore, supports one end of a strong helical spring 129, the other end of which rests against the face of the ring 120 to normally move the piston 115 towards the left in Fig. 4. The tubular piston rod 123 has a central passageway 130 to permit the reciprocation therein of a rod 131 having a head 132 which is prevented from escaping from the end of the tubular piston rod 123 by providing therein an internal flange 133. The said tubular piston rod 123, furthermore, carries, against the right face of the sleeve member 125, a ring 134, a U-shaped rubber gasket 135 and an angular positioning ring 136 which is perforated to prevent an air lock. The ring 134 rests against a shoulder on the sleeve member 125 and the ring 136 rests against a shoulder within the cylinder 126. The said rod 131, at its rear end, has a cylindrical valve 137 screw-threaded thereto and held in place by a lock nut 137a, said cylindrical valve 137 being provided with a conical end 138 which is arranged to seat on the valve seat 34 which is located in the valve casing passageway 33. A coil spring 140 normally forces the valve 138 against its seat when permitted by the compression of the spring 129, said spring being located around a reduced extension 141 on the cylindrical valve 137, the other end of said spring being seated on a disc 142 supported by a shoulder 143 on the cylinder 126, a port 144 being provided in the disc 142.

In the form of my invention shown in Figs. 5 to 8A, I have shown a modified form of my invention which is much simpler in construction and which can be manufactured at a much lower cost. In this form of my invention I have shown on the fitting 15, which leads to the master cylinder 11 by means of the pipe 14 in the same way as in the previously described form of my invention, a valve casing 16 constructed substantially the same as in the previous form of my invention and which leads by the same passages previously described, to the outlet opening 36 in a casting 144a connected to the pipe 38 leading to the brakes for the operation thereof. In this form of my invention there is a passageway 145 in said casting 144a leading from the inlet 15, to which there is connected an angle-fitting 146 having therein a pipe 147. This pipe 147 leads to a fitting 148 which is screw-threaded into a plunger housing 149 leading by a passageway 150 to a chamber 151 which is closed by a plug 152 having a reduced inner end 153 acting as a stop for the left face of a plunger 154 having a U-shaped rubber seal 155, in an annular recess 156 on said plunger. Said plunger 154 has an internal screw-thread 157 to receive a stem 158 on a smaller plunger 159 in the chamber 151. The smaller plunger 159 has a U-shaped rubber seal 160 in an annular recess 161. Furthermore, the said chamber 151 has a passageway 162 leading to a fitting 163 which is connected by a pipe 164 to a fitting 165 communicating with the outlet opening 36 for the hydraulic liquid. Also, the said chamber 151 has communicating therewith a further passageway 166 containing an air bleeder screw 167 for normally closing the passageway 166. The said screw 167 has a transverse passageway 168 leading to a central passageway 169 in the screw 167, which passageway 169 is normally closed by a removable screw 170. It will of course be understood that, if desired, the air bleeder 79, shown in connection with the previous form of my invention, may be constructed the same as the air bleeder screw 167 and associated parts just described. The smaller plunger 159 has on its rear face an extension 171 to which there is attached an outlet valve 172, a rubber gasket 173 being provided in an annular recess 174 adjacent to the plunger 159. The said outlet valve 172 is adapted to seat on a rubber grommet 175, that is to say an eyelet-shaped body of flexible rubber. This is strengthened by an internal stiffening sleeve 176 providing a passageway 177 through the center thereof. The said grommet 175 has a forward L-shaped flange 178 which is clamped against the plunger housing 149 by means of a spacing ring 179 and screws 180. The said grommet 175 also has a rear flange 181 acting as an inlet valve therefor. In order to provide freedom of movement and in order to provide an air inlet chamber 182, the grommet 175 is spaced away from the inner periphery of the ring 179. It will be noted, furthermore, that the ring 179 has transverse passageways 183 for the inlet of air to the chamber 182 from an outer chamber 184 which communicates with the outer air through a peripheral space 185 between the ring 179 and the plunger housing 149. Air, which is thus admitted from the chamber 182, when the flange 181 is unseated from the ring 179, will pass through passageways 186 provided by lugs 187 which support a stop plate 188 held in place on the ring 179 by screws 189. The air in this way reaches a space 190 within a cylinder 191 which is supported around a shoulder 192 on the rear face of the ring 179. Within the said cylinder 191 there is arranged to reciprocate a piston 193 which supports a leather ring 194 having on the front face of said ring 194 a supporting disc 195. On the rear face of the piston 193 there is a felt lubricating ring 196, adapted to be provided with a body of lubricating oil initially. The said felt ring has a supporting disc 197. The discs 195 and 197 and the piston 193 are carried on a screw 198 having a head 199 contacting with the stop plate 188, and which is screw-threaded into a tubular piston rod 200 having a central passageway 201 therein. The other end of the piston rod 200 is arranged to slide within a bushing 202 in a screw-threaded sleeve 203 which is screw-threaded to a cylinder 204. The forward end of the cylinder 204 is headed into a cylinder head 205 of the cylinder 191, which head 205 acts as a support for a strong helical spring 206, the other end of which is supported against the disc 197. A vacuum pipe 207 leading from the manifold of the internal combustion engine is screw-threaded into a vacuum valve casing 208, having a check valve 209 with peripheral notches 210, which seats against a valve seat 211 supported in the valve casing 208, the latter being headed over into the cylinder head 205. The vacuum thus communicated to the chamber 191 is conveyed to the other end of the cylinder 191 by a pipe fitting 212 headed into the cylinder head 191, into which there is screw-threaded an angle fitting 213 connected by a pipe 214 to an angle fitting 215 screw-threaded into a passageway 216 which connects with a vacuum chamber 217, in which the outlet valve 172 is located. The rear end of the tubular piston rod 200 is provided, at the end of the sleeve 203, with a ring 218 adjacent to a U-shaped rubber seal 219, adjacent to which there is a ring 220 which is ported to prevent an air lock. The ring 218 rests against the rear end of the sleeve 203 and the ring 220 rests against the shoulder within the cylinder 204. Within the central opening 201 there is arranged to reciprocate a head 221 on a rod 222, said head being prevented from escaping from the tubular piston 220 by an internal flange 223. The said rod 222, at its rear end, is screw-threaded to a cylindrical valve member 224, held in place by a lock nut 224a, having a flexible rubber valve 225 therein which is arranged to seat against the valve seat 34. A coil spring 226 located around a reduced extension 227 on the cylindrical valve 224 is supported at its other end upon a disc 228 having a port 229, said disk being supported upon a shoulder 230 in the cylinder 204, which is screw-threaded into the casting 144a.

Figure 8:
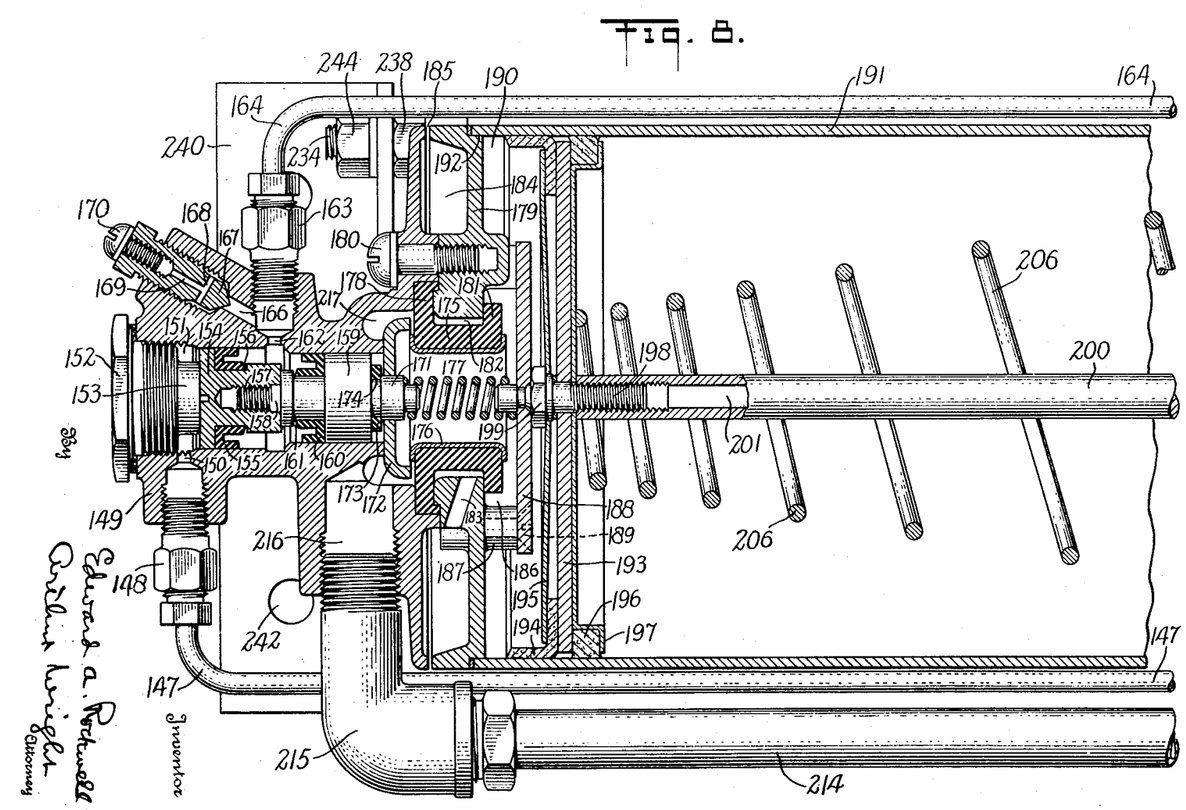
Figs. 8 and 8A show a vertical section of the modification shown in Fig. 5.
Figure 8A:
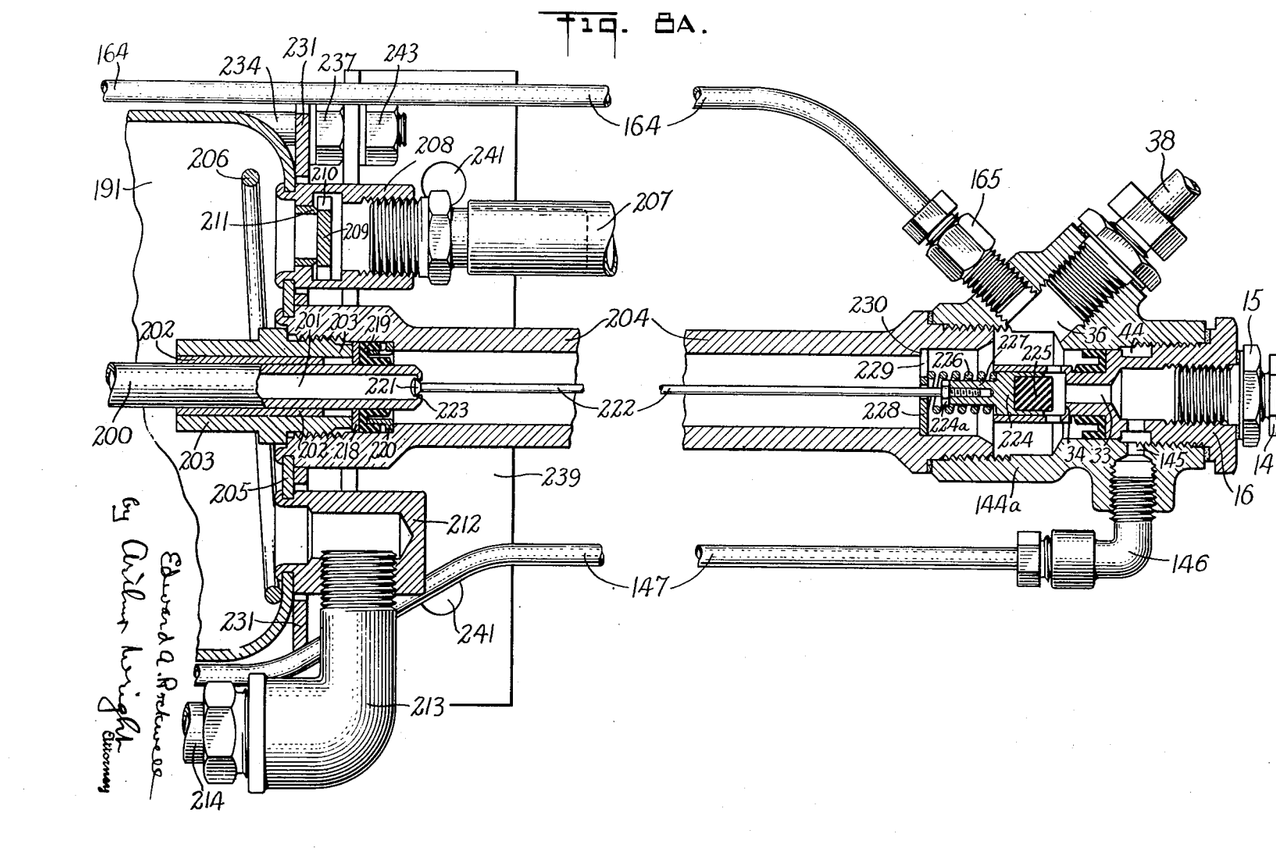
Figure 9:
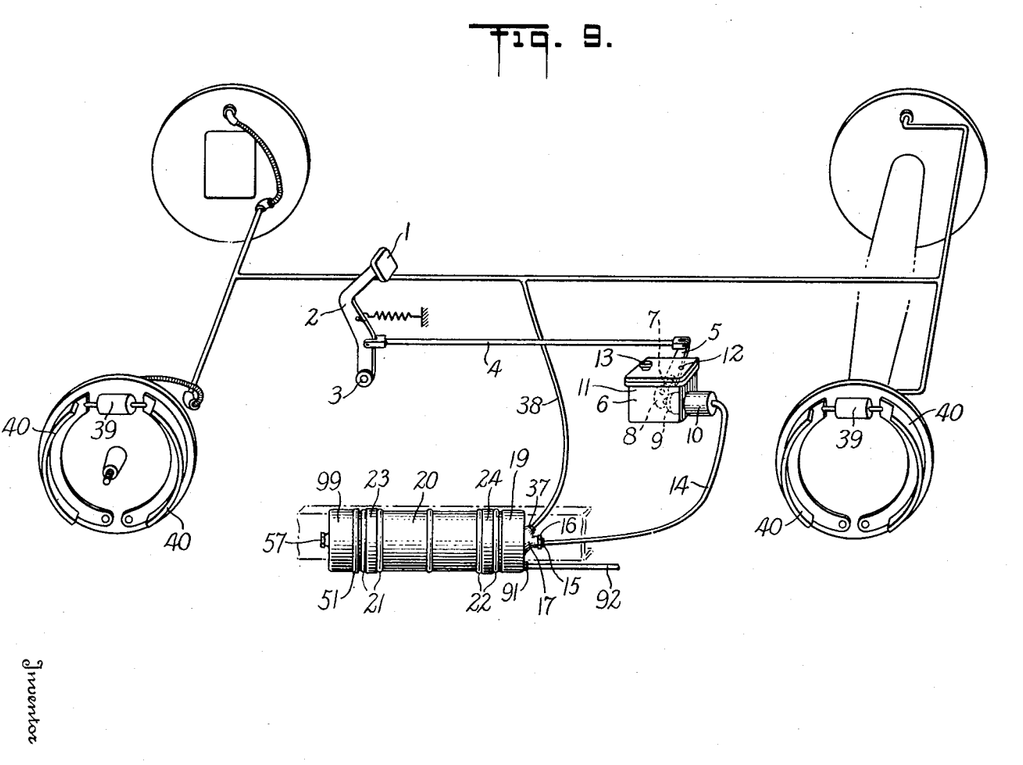
Fig. 9 is a diagrammatic arrangement of the system including my power unit, for example the embodiment shown in Figs. 1 to 4A thereof.

The cylinder 191 and attached parts to the right thereof are clamped against the ring 179 by means of a clamping plate 231 and three bolts 232, 233 and 234, which pass through said plate 231 and the ring 179. The bolt 232 is provided merely with nuts 235 and 236, whereas the bolts 233 and 234 are longer than the bolt 232 and are provided with inner nuts 237 and 238 which hold the cylinder 191 and attached parts together, while located outside of the nuts 237 and 238 there are brackets 239 and 240 having holes 241 and 242 for supporting the power unit from the chassis of the automobile. Nuts 243 and 244 are located on the ends of the bolts 233 and 234 in order to fasten the bolts 233 and 234 securely to the brackets 239 and 240.

Figure 10:
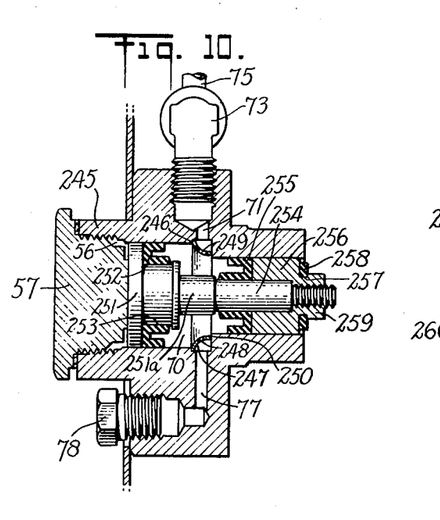
Fig. 10 is a horizontal transverse section showing a slightly different arrangement of the differential plunger and housing therefor.

In Fig. 10 I have shown a slightly different form of differential plunger and housing in which it is contained, as compared with the plunger and housing shown in Figs. 1 to 8. In this figure I have shown a differential plunger housing 245 which is constructed in general like the plunger housing 54 having the plug 57 therein, the reaction line port 71 and the fitting 73 communicating with the pipe 75, also the bleeder port 77 and the bleeder screw 78 for releasing accumulated air. In the chamber 70 therein there is an annular recess 246 in which there is located a flared ring baffle 247 provided with a small port 248 opposite to the bleeder passageway 77 and a large port 249 opposite to the reaction line port 71. The said ring 247 is tightly retained in the recess 246 against a shoulder 250 within said chamber 70. A large plunger head 251 located within the chamber 70, has a U-shaped rubber seal 252 in an annular recess 253 therein. The said plunger 251 has a stem 251a provided with a reduced extension 254 on which there is carried a rubber seal 255 adjacent to a small plunger 256. On a reduced extension 257 of the plunger 256 there is a gasket 258 adjacent to a head 259 which is screw-threaded on the end of said extension 254. The end of the stem 251a serves the same purpose as the end of the extension 81 shown in Fig. 4, to receive one end of the spring 113.

Figure 1:
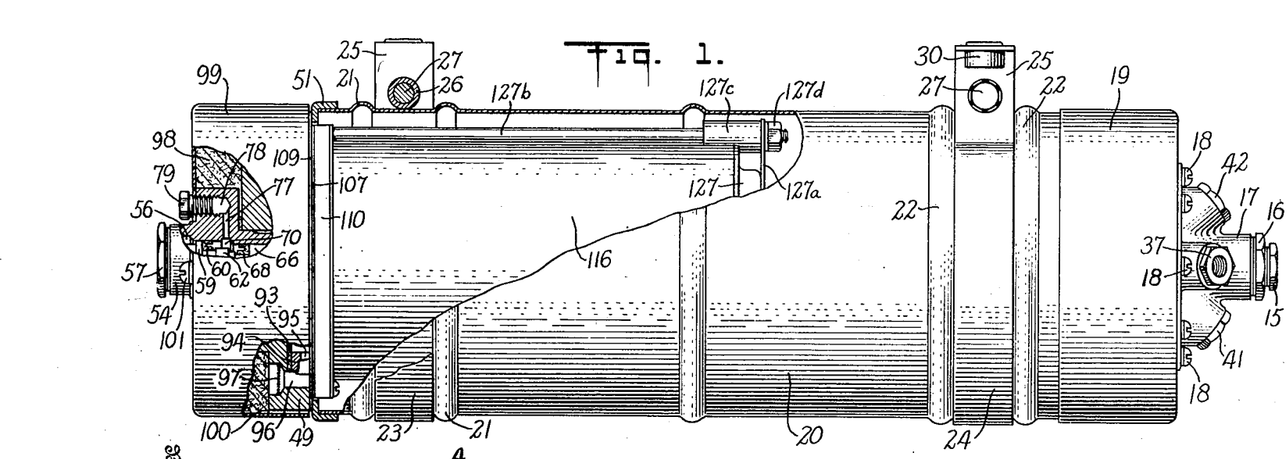
Fig. 1 is a plan view of a power unit system made in accordance with my invention, taken partly in section on line 1—1 of Fig. 3.
Figure 2:
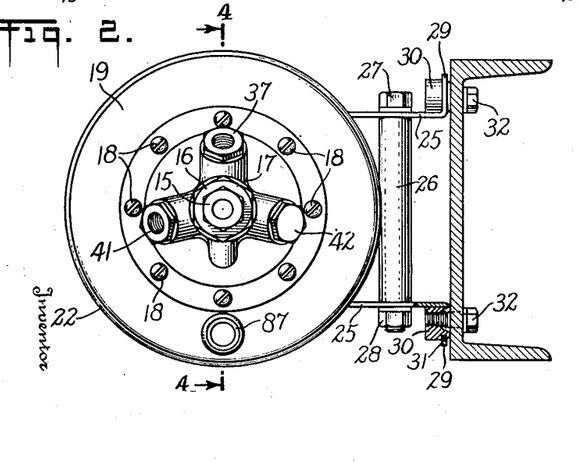
Fig. 2 is an end elevation of the same.
Figure 3:
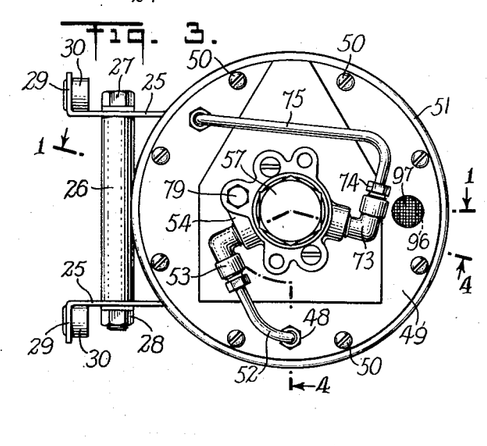
Fig. 3 is an elevation of the other end of the same with the cover removed.
Figure 11:
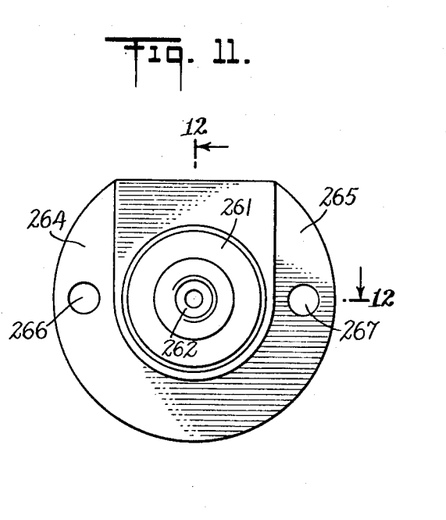
Fig. 11 is an end elevation of another modified form of reaction plunger that may be used.
Figure 12:
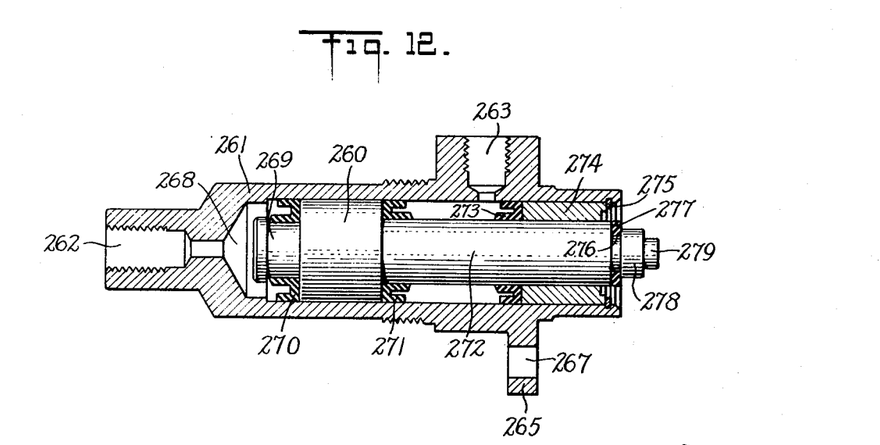
Fig. 12 is a longitudinal section of the same taken on line 12—12 of Fig. 11.

In Figs. 11 and 12 I have shown a plunger 260 that can take the place of the plunger 59, 66, in Fig. 1. The plunger 260 is located in a plunger housing 261, having an inlet port 262 which can be connected to the pipe 52, and a port 263 which can be connected to the fitting 73, as well as flanges 264 and 265 provided with holes 266 and 267 to receive screws for attachment of the housing to the casting 49. This housing 261 can be attached to the cover 99 in any desired way but, for example, in the same way as shown in Fig. 1.

Within the housing 261 there is a bore 268 for the plunger 260. The said plunger has an annular recess 269 to receive a rubber seal 270 and is provided also with a rubber seal 271, which latter fits over a reduced extension 272 extending through a stationary rubber seal 273, adjacent to a bushing 274 and held in place by a snap ring 275. Beyond the extension 272 there is an annular recess 276 to receive a sealing ring 277 adjacent to an enlargement 278 to which the outlet valve 80 is attached. A small extension 279 receives the spring 113.

In the operation of the form of my invention shown in Figs. 1 to 4A and 9, assuming that the master cylinder 11 has been provided with a supply of hydraulic liquid, that the engine is in operation and that it is desired to operate the brakes, upon moving the pedal 1 downwardly, the hydraulic fluid will be forced from the master cylinder 11 by means of the pipe 14 through the valve casing 16 till it reaches the opening 36 and is thence discharged by the pipe 38 to the brake system so as to initially move the brakes into position. At the same time the hydraulic liquid will be conveyed by the pipe 47 to the left face of the plunger 59 in the chamber 70 so as thus to seat the outlet valve 80 and unseat the atmospheric air inlet valve 106 to a slight extent, as desired. This initial action in seating the brakes will not be sufficient, however, to start the movement of the piston 115, owing to the compressed helical spring 129. At the same time, also, it will be understood that the hydraulic liquid from the opening 36 is in communication, by the pipe 75, with the chamber 70 located between the differential plungers 59 and 66. Upon further movement of the pedal 1, thereby increasing the pressure supplied through the pipe 14, the pressure against the face of the plunger 59 will be accordingly increased, thereby resulting in the further opening of the atmospheric air inlet valve 106 while retaining the outlet valve 80 closed. This position of the valves cuts off the vacuum from access to the left face of the piston 115 and admits atmospheric air from the chamber through the passageways 96, 95 and 105 to the desired extent, resulting in the movement of the piston 115 to the right. This movement of the piston 115 permits the valve 138 to become seated, thus cutting off further access of the liquid from the opening 15 to the opening 36, and thereafter the movement of the piston rod 123 in the cylinder 126 causes the liquid in the latter to be forced under an increased pressure out through the pipe 38, thereby applying power for the operation of the brakes. At all times, however, it will be noted that before and after the application of the power the pressure of the hydraulic liquid applied to the brakes is arranged to react through the pipe 75 on the differential plunger 59, 66 so that the foot at all times receives the reaction of the actual pressures being applied to the brakes. It will be noted that the plunger 59 has a larger rear area than the front face of the plunger 66 so as to produce this reaction towards the foot. In this way, furthermore, the reaction towards the foot produces an extreme nicety of control in the application of the brakes. Besides, any danger of power lock of the brakes, especially during the range of the highest power pressures applied by the apparatus, is avoided. However, in any one position in which the pedal 1 is held in the power application, the admission of the amount of air permitted to pass from the left face of the valve 106 to the right face thereof will cause the valve 106 to become seated due to the increase relative pressure on the right face of said valve 106. Also, any hysteresis due to hunting of the movable parts back and forth, is avoided, especially as with this arrangement it is not necessary for the foot to be moved too far in changing from a given pressure applied to the brakes to a slightly lower pressure application of the brakes. It will be understood, of course, that the relative sizes of the plungers 59 and 66 can be changed as well as the actual sizes thereof according to the type of vehicle to which it is applied. Upon releasing the pedal 1, to release the brakes, the inlet valve 106 becomes seated on the diaphragm 93 and the outlet valve 80 is then opened, thus giving access of the vacuum to the left face of the piston 115 and cutting off the same from access to the outer air. Inasmuch as the right face of the piston 115 is always subject to the vacuum and as the left face now has access to the vacuum, the piston 115 will be returned by the spring 129 to its initial position, resulting in the head 132 of the rod 131 being moved by the flange 133 on the piston rod 123 towards the left, again unseating the valve 138 and thus place in communication again the opening 15 and the opening 36, ready for subsequent manual application of the brakes.

In the form of my invention as shown in Figs 5 to 8, the operation takes place in substanially the same way as just described in connection with Figs. 1 to 4A and 9. In this instance, however, the submergence of the piston in the vacuum, which in the previous form of my invention is accomplished by the outer casing 20, is brought about by the pipe 214 which communicates with the two faces of the piston 193. Also, instead of having two diaphragms, a valve-seating spring and two rigid valves seating thereon, as in the previous form of my invention, I have provided the single rigid outlet valve 172 which seats on the rubber grommet 175, the latter serving as a self-closing inlet valve in connection with the ring 179 which supports the grommet 175. In other words, when the power is being applied from the power unit to the brake, the valve 172 will first become seated upon the grommet 175 and further movement of the valve 172 will push the flange 181 of the grommet 175, acting as an inlet valve, off its seat on the ring 179, thus admitting to the desired extent the air through the passageways 185, 183 and chamber 182, to the left face of the piston 193, resulting in the movement of the same to apply the power to the brakes in the same way as described in connection with the previous form of my invention. In this form of my invention, furthermore, I have utilized a somewhat different type of valve 225 which is made of flexible rubber, but serves substantially the same purpose as the conical valve 138 described in connection with the previous form of my invention.

The operation of the modified form of plunger and housing shown in Fig. 10 is substantially the same as the corresponding parts in Figs. 1 to 9. In this instance, however, the ring-shaped baffle plate 247 has been provided to permit the bleeding of the air out of the chamber 70, irrespective of whether the bleeder passageway 77 is located at the top or some other radial position with regard to the chamber 70. This becomes useful where for some reason the power unit is desired to be installed in different radial positions so far as the bleeder passageway 77 is concerned. The view in Fig. 10 shows a substantially horizontal section. However, it will be understood that if the bleeder port 77 is at the top of the apparatus the air will readily pass out of the chamber 70 through the small hole 248 and passageway 77 when the bleeder screw 78 or 170 is removed. If, instead, the passageway 77 happens to be located at the bottom of the apparatus, when air has accumulated in the upper portion of the chamber 70, the removal of the bleeder screw 78 or 170 will cause the air to pass around the outer periphery of the baffle 247 so as to be discharged through the passageway 77. Owing to the relative size of the openings 248 and 249, this air will enter the large port 249 and be discharged through the passageway 77 faster than it can escape through the small port 248. On the other hand, when the passageway 77 happens to be at the top of the apparatus the port 248 is large enough to permit the escape of air. The operation of the modified plunger 260, in Figs. 11 and 12, is similar to the operation in the preceding figures except that in this instance the seal 273 is stationary whereas in the preceding figures the seal 68 is movable with the plunger 66.

In all forms of the plunger the area producing a reaction on the foot from the return circuit connected to the delivery line is a small annular area on which the liquid presses against the pedal pressure and the remainder of the area within said annulus is the area receiving the main reaction from the brake operating liquid which is exerted as a reaction back on the pedal through the valve mechanism.

While I have described my invention above in detail I wish it to be understood that many changes may be made therein without departing from the spirit of the same.

I claim:

1. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet mounted on the outlet end of said high pressure chamber beyond the end of the plunger for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet, located beyond the same end of the plunger for liquid from said plunger chamber connected to said hydraulic liquid inlet, and a hydraulic conduit leading from said hydraulic inlet outside of said piston to the control plunger.

2. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet mounted on the outlet end of said high pressure chamber beyond the end of the plunger for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet, located beyond the same end of the plunger, for liquid from said plunger chamber connected to said hydraulic liquid inlet, a hydraulic conduit leading from said hydraulic inlet outside of said piston to the control plunger, and a fluid pressure pipe outside said casing leading from one end of said casing at one side of the movable wall to said valve means on the other side of the movable wall.

3. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet mounted on the outlet end of said high pressure chamber beyond the end of the plunger for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet, located beyond the same end of the plunger, for liquid from said plunger chamber connected to said hydraulic liquid inlet, and a hydraulic conduit leading from said hydraulic inlet outside of said piston to the control plunger, said casing having secured thereto a head piece containing said high pressure chamber.

4. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet mounted on the outlet end of said high pressure chamber beyond the end of the plunger for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet, located beyond the same end of the plunger, for liquid from said plunger chamber connected to said hydraulic liquid inlet, a hydraulic conduit leading from said hydraulic inlet outside of said piston to the control plunger, and a fluid pressure pipe outside said casing leading from one end of said casing at one side of the movable wall to said valve means on the other side of the movable wall, said casing having secured thereto a head piece containing said high pressure chamber.

5. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, said casing having secured thereto a head piece containing said high pressure chamber, and a hydraulic liquid cut-off valve movable apart from said plunger, having a stationary valve seat, and operated by the first mentioned plunger in the high pressure chamber.

6. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber.

7. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, said casing having secured thereto a head piece containing said high pressure, and a hydraulic liquid cut-off valve movable apart from said plunger, having a stationary valve seat, and operated by the first mentioned plunger in the high pressure chamber to cut off direct communication between the hydraulic inlet and the delivery outlet.

8. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber to cut off direct communication between the hydraulic inlet and the delivery outlet.

9. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, said casing having secured thereto a head piece containing said high pressure, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger.

10. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger.

11. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, said casing having secured thereto a head piece containing said high pressure, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger or held closed by fluid pressure.

12. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger or held closed by fluid pressure.

13. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic liquid inlet outside of said casing to the control plunger, said casing having secured thereto a head piece containing said high pressure, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger or held closed by fluid pressure, said cut-off valve having a valve seating spring.

14. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber to cut off direct communication between the hydraulic inlet and the delivery outlet, arranged to be held open by said first mentioned plunger or held closed by fluid pressure, said cut-off valve having a valve seating spring.

15. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, said casing having secured thereto a head piece containing said high pressure, and a hydraulic liquid cut-off valve movable apart from said plunger, having a stationary valve seat, and operated by the first mentioned plunger in the high pressure chamber to cut off direct communication between the hydraulic inlet and the delivery outlet but to open said communication when the inlet exceeds the power pressure.

16. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a conduit leading from said hydraulic inlet outside of said casing to the control plunger, a fluid pressure pipe outside said casing leading from one end of said casing at one side of the movable wall to said valve means on the other side of the movable wall, said casing having secured thereto a head piece containing said high pressure chamber, and a hydraulic liquid cut-off valve movable apart from said plunger, having a stationary valve seat, and operated by the first mentioned plunger in the high pressure chamber to cut off direct communication between the hydraulic inlet and the delivery outlet but to open said communication when the inlet pressure exceeds the power pressure.

17. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, and a hydraulic conduit leading from said hydraulic inlet outside of said piston to the control plunger, said casing having secured thereto a head piece containing said high pressure chamber, said hydraulic head piece carrying, located beyond one end of the pressure-increasing plunger, said inlet, delivery outlet and a connection for said conduit.

18. A power unit comprising a cylindrical casing forming a low pressure chamber, an inlet for a fluid pressure differing from the atmospheric pressure, a piston in said chamber, having a pressure-increasing plunger connected thereto, adapted to be moved by said pressure, a high pressure chamber for said plunger, an inlet for a hydraulic liquid for controlling the power unit, valve means, located together with said hydraulic inlet beyond the end of the plunger and controlled by the hydraulic liquid from the inlet for controlling the application of said fluid pressure to said piston, a control plunger arranged to be moved by said hydraulic liquid, a delivery outlet for liquid from said plunger chamber connected to said hydraulic liquid inlet, a hydraulic conduit leading from said hydraulic inlet outside of said piston to the control plunger, and a fluid pressure pipe outside said casing leading from one end of said casing at one side of the movable wall to said valve means on the other side of the movable wall, said casing having secured thereto a head piece containing said high pressure chamber, said head piece carrying, located beyond one end of the pressure-increasing plunger, said hydraulic inlet, delivery outlet and a connection for said conduit.

EDWARD A. ROCKWELL.

REFERENCES CITED

The following references are of record in the file of this patent:

UNITED STATES PATENTS

| Number | Name | Date |
|---|---|---|
| 1,847,604 | Finsen | Mar. 1, 1932 |
| 2,032,185 | Sciaky | Feb. 25, 1936 |
| 2,235,858 | Williams | Mar. 25, 1941 |
| 2,252,482 | Gates | Aug. 12, 1941 |
| 2,260,490 | Stelzer | Oct. 28, 1941 |
| 2,260,492 | Stelzer | Oct. 28, 1941 |
| 2,353,755 | Price | July 18, 1944 |
| 2,382,444 | Rockwell | Aug. 14, 1945 |
| 2,448,464 | Rockwell | Aug. 31, 1948 |